United States Patent [19]

Radaelli et al.

[11] 4,323,976
[45] Apr. 6, 1982

[54] ELECTRONIC DEVICE FOR TAKING THE SPEED OF A ROTATING MEMBER

[75] Inventors: Dario Radaelli, Legnano; Giancarlo De Angelis, Milan; Alberto Catastini, Corsico, all of Italy

[73] Assignee: Alfa Romeo S.p.A., Milan, Italy

[21] Appl. No.: 62,481

[22] Filed: Jul. 31, 1979

[30] Foreign Application Priority Data

Aug. 9, 1978 [IT] Italy .............................. 26635 A/78

[51] Int. Cl.³ .............................................. G01P 3/42
[52] U.S. Cl. ............................... 364/565; 235/92 FQ; 324/160
[58] Field of Search ................ 364/565; 324/160, 161, 324/165, 176; 340/146.2; 235/92 CA, 92 MP, 92 FQ

[56] References Cited

U.S. PATENT DOCUMENTS

| | | | |
|---|---|---|---|
| 3,886,542 | 5/1975 | Ohtsuka | 235/92 MP |
| 4,056,287 | 11/1977 | Gudat | 364/565 |
| 4,125,295 | 11/1978 | Ruhnau et al. | 235/92 FQ |
| 4,171,522 | 10/1979 | Powell | 235/92 FQ |
| 4,177,516 | 12/1979 | Mason | 364/565 |

Primary Examiner—Errol A. Krass
Attorney, Agent, or Firm—Charles E. Brown

[57] ABSTRACT

This invention relates to an electronic device for taking the speed of a rotating member. In order to provide speed signals having a different degree of discrimination at the interior of a determined range of values, the device according to the invention comprises transducer means operatively connected to the rotating member to generate a first train of pulses, pulse generating means for generating a second train of pulses at a constant frequency, counting means for counting the pulses of said second train between two subsequent selected pulses of said first train, and a microprocessor for comparing the counted pulses with reference numbers comprised between predetermined minimum and maximum values corresponding to higher and lower values of a maximum speed zone of the speed range.

4 Claims, 2 Drawing Figures

ELECTRONIC DEVICE FOR TAKING THE SPEED OF A ROTATING MEMBER

It is known that with many systems of adjustment the acquisition of a magnitude utilized as an adjusting parameter should be done in such a way as to take into account the different sensitivity that the magnitude in question presents as a function of its effective value in the process under control. With other words, it is necessary to take said magnitude with different degrees of resolution according to the value it assumes within its field of variability.

That is for instance the case of the operative parameters of an internal combustion engine (revolving speed, angle of the shutter throttle, etc.), that are generally utilized as adjustment parameters for the control of the functional characteristics of the engine, such as carburation, spark lead, etc.

For instance, with adjustment processes with which a higher accuracy of intervention is required at slow running rather than at high speed of the engine, it is necessary for the speed signal delivered by the transducer to present a great crowding of values at slow running, whilst at high speed a minor crowding of values suffices.

It is an object of the present invention to provide an electronic device for taking the speed of a shaft turning at variable speed, in particular of the shaft of an internal combustion engine, which should be capable of delivering a digital signal having a different degree of discrimination of the values within a range of speed variation, namely which should present a different distribution of values (a greater or smaller crowding of said values) at the different speeds of running, slow or high.

Considering that object the device according to the invention is capable of delivering digital speed signals with a different degree of discrimination of values within said range of variation of speed, said range of variation of speed being subdivided into a predetermined number of zones represented by respective speed limits having increments variable according to a predetermined law with the growing of the absolute value of speed, each zone being further subdivided into a predetermined number of intervals represented by respective speed limits having increments variable according to another predetermined law with the growing of the absolute value of speed in the zone considered, the device being characterized in that it comprises transducer means operatively connected with the turning member to generate at every revolution of said member a first train of impulses spaced in time in a manner inversely proportional to the speed of rotation of said member, impulse generating means apt to generate a second train of impulses at constant frequency, counting means operatively connected with said transducer means and with said impulse generating means, said counting means being apt to effect the count of the impulses of the second train of impulses and being controlled to start and to stop the operation of counting by two preselected impulses in succession of the first train of impulses, comparating means operatively connected with said counting means, apt to compare the number of impulses totalized by the counting means during the counting operation with reference values comprised between a predetermined minimum value and a predetermined maximum value corresponding to the lower limit of the zone of highest speed of the range of variation considered and apt to evaluate whether the said number of impulses totalized is comprised between the said minimum and maximum values or whether it is higher than said maximum value, wherein the said comparating means and the said processing means are preferably conglobated in a programmed microprocessor comprising a first register into which are successively chargeable starting from a first fixed value corresponding to the total number of intervals into which the range of speed is subdivided, a second fixed value corresponding to said maximum value and a third fixed value corresponding to said minimum value and spaced from said second fixed value by a number corresponding to the number of intervals into which every zone of the range of speed is subdivided, a second register into which is charged said number of impulses totalized by said counting means, a counter with a state of count brought up-to-date from one to the other of a series of numerals indicative of the various zones of the range of speed beginning from the one corresponding to the zone of maximum speed, a subtractor and an output accumulator register to which said up-to-datable counter delivers zone data in the shape of data indicative of its own counting state, a microprocessor being programmed to compare the number charged into the second register with the fixed value charged time by time into the first register and to divide said number charged into the second register by selected coefficients of division to obtain a demultiplicated number to be substituted for said charged number in such a way that:

(a) if, with said first register charged with said first fixed value, the number charged into the second register is lower than said first fixed value, the microprocessor operates the commutation of said first register from said first fixed value to said second fixed value;

(b) if, with said first register charged with said second fixed value, the number charged into the second register is lower than said second fixed value, the microprocessor operates the commutation of said first register from said second fixed value to said third fixed value;

(c) if, with said first register charged with said first fixed value or with said second fixed value, the number charged into the second register is higher than said first or respectively second fixed value, the microprocessor operates the putting up-to-date of said up-to-datable counter and operates the actuation of said divisor to obtain from said charged number a demultiplied number and the charging of the latter into said second register to be substituted for said number previously charged;

(d) if, with said first register charged with said third fixed value, the number charged into the second register is higher than said third fixed value, the microprocessor operates the subtractor so as to subtract said charged number from a fourth fixed value equal to said second fixed value minus one and to transmit the difference to said accumulator register as a datum of interval to be combined with the datum of zone delivered by said up-to-datable counter;

(e) if, with said first register charged with said third fixed value, the number charged into the second register is lower than said third fixed value, the comparator transmits directly to the accumulator register a signal indicative of a datum of interval higher than the maximum speed considered.

Still according to a preferred embodiment, and for the purpose of imparting to the device according to the invention the highest accuracy and reliability, the aforesaid transducer means are constituted by a wheel movable with a speed proportional to the speed of the turning member (rotating member), the wheel being provided with at least two fiducial marks placed at its periphery and at a predetermined angular distance, and are also constituted by at least one sensor apt to deliver an impulse every time a mark of the wheel passes in front of it.

The features and advantages of the invention will be more readily understood by considering the accompanying drawings in which there is diagrammatically represented, by way of example without any limitation, a preferred embodiment of the invention. In particular:

Figure 1:
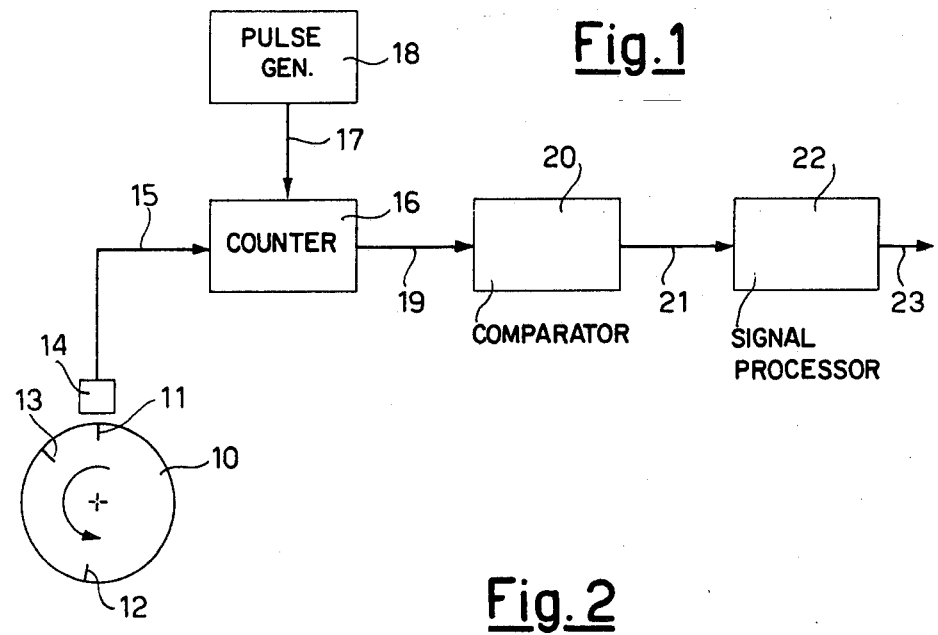
FIG. 1 shows the general block diagram of the device according to the invention.

In FIG. 1 there is indicated by reference numeral 10 a wheel turning at a speed proportional to the speed of the rotating member (turning member) of which the speed is to be ascertained; the wheel 10 is provided with three fiducial marks, the notches 11, 12 and 13; the notches 11 and 12 are spaced apart by a suitable predetermined angle and the notch 13 is spaced apart from notch 12 by another suitable predetermined angle.

In FIG. 1 then there is indicated by reference numeral 14 a sensor placed in the proximity of the periphery of the wheel 10; the sensor 14 may be of opto-electric or magnetic type or of any other kind adapted to detect the presence of the notches and to deliver an impulse every time a notch passes in front of it.

The sensor 14 is connected by means of a line 15 and a counter of impulses (impulse counter) represented by the block 16, which in turn is connected through a line 17 to the generator of constant frequency impulses represented by the block 18.

From the counter 16 there extends a line, indicated by reference numeral 19, which is connected to a comparator 20; the latter is connected by means of a line 21 with a signal processor represented by the block 22; the output of the circuit 22 is indicated by reference numeral 23.

At every revolution of the wheel 10 the sensor 14 delivers a train of impulses constituted by the impulses generated by the successive passing by of the notches 11, 12 and 13 in front of it; the period of time elapsing between one impulse and the subsequent one varies with the speed of rotation of the wheel 10, the notches being spaced apart by fixed angles. This train of impulses arrives through the line 15 at the counter 16, which receives also through the line 17 the train of constant frequency impulses delivered by the generator 18. The counter 16 performs the counting of the constant frequency impulses that reach it in the lapse of time running from the passage of the notch 11 and the subsequent passage of the notch 12 in front of the sensor 14; the impulse generated by the notch 11 operates the counter 16 to start the operation of counting, the impulse generated by the notch 12 operates the counter 16 to stop the operation of counting. The signal constituted by the number of impulses at constant frequency totalized in the aforesaid lapse of time is forwarded through the line 19 to the comparator 20 that performs the comparison between this signal and a pre-established succession of reference values comprised between a minimum value and a maximum value, said maximum value corresponding to the lower limit of the zone of maximum speed of the range of variation considered and said minimum value corresponding to a prefixed maximum speed higher than said lower limit.

There may occur two cases: the number of totalized impulses is between the aforesaid minimum and maximum values or it is higher than the maximum value.

In the former case the signal constituted by the number of impulses totalized is forwarded together with a signal of consent, through the line 21, to the processor 22 which without effecting any manipulations thereof sends it to the outlet 23. Owing to what has been set forth above, the fact that the number of impulses totalized is between the aforesaid minimum and maximum values means that the instantaneous value of the speed of rotation of the wheel 10 (and, therefore, of the turning member) is located in the zone of the range of speed that comprises a series of preselected maximum values; the numeric value of this signal individualizes in this zone the interval wherein there is the same instantaneous value of speed and represents the value of speed belonging to the extremum of the interval so individualized in the aforesaid zone.

In the second case, the signal constituted by the number of impulses totalized is forwarded together with a signal of intervention to the processor 22, which manipulates it until making it assume a value between the pre-established minimum and maximum values; according to a preferred embodiment it is provided that the signal constituted by the number of impulses totalized is divided by preselected coefficients of demultiplication until obtaining a number of impulses calculated that is comprised between the same minimum and maximum values.

The coefficient of demultiplication utilized individualizes the zone in which the instantaneous value of speed of the wheel 10 is comprised, because with every zone of the range of speed different from the one that comprises the maximum values, there is paired a determined coefficient of demultiplication; the demultiplied numeric value in turn individualizes the interval of the aforesaid zone in which the instantaneous value of speed is comprised and represents the value that corresponds to the extremum of said interval; that value of speed, possibly after having undergone a decoding, appears at the output 23.

The impulse delivered by the sensor 14 at the passage of the notch 13, reaching the counter 16 at every revolution of the wheel 10, effects the cancellation of the signal constituted by the impulses totalized in the same revolution in the lapse of time running between the successive passages of the notches 11 and 12 before the sensor 14 and, therefore, prepares the counter 16, and with it the comparator 20 and the processor 22, to effect the counting in the subsequent revolution of the wheel 10.

As an alternative, the wheel 10 may not be provided with the notch 13, and the signal of cancellation can reach the contact 16 from the output 23 of the processor 22, and can be constituted by the speed value that appears at the very output 23.

The device hereinbefore described is provided with a mechanical-electrical transducer of the speed of rotation very advantageous as to accuracy and reliability of response, because it is constituted by a wheel (10) provided with a limited number of notches: that reduces the possibility of errors and inaccuracies due to the unavoidable tolerances that occur in the positioning of every notch with respect to a reference notch.

In the particular case for instance there are only two notches (11 and 12) of the wheel 10 intervening in the taking of the speed of rotation, the operation of counting by the counter 16 being operated just by the impulses generated by said two notches.

Figure 2:
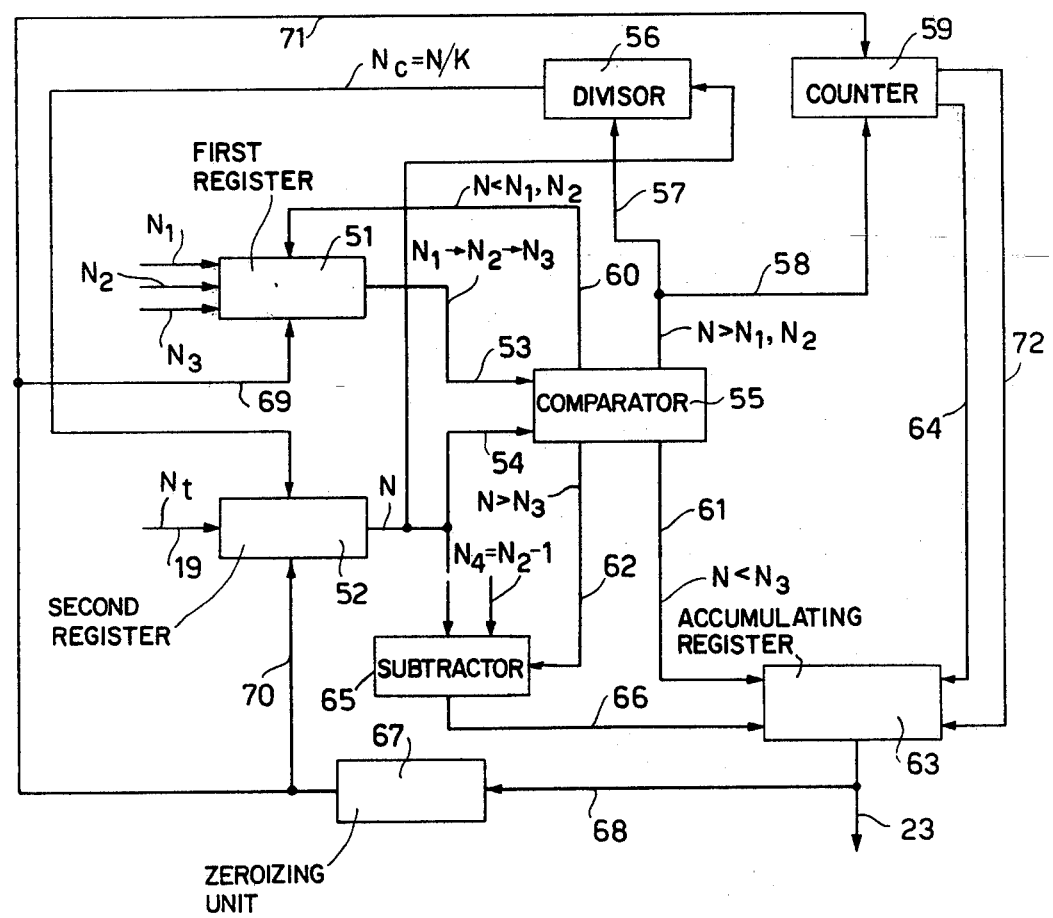
FIG. 2 shows the block diagram more detailed of a preferred embodiment of a portion of said device.

In FIG. 2 there is shown by way of example the block diagram of a circuital complex carrying out the functions of the comparator 20 and of the processor 22 and consisting substantially of a conveniently programmed microprocessor. Said microprocessor provides in particular a first register 51 and a second register 52, the numeric outputs 53 and 54 whereof are compared with each other in a comparator 55. Into the register 51 are chargeable in succession three different fixed numeric values $N_1$, $N_2$ and $N_3$, the first one of which corresponds to the total number of the intervals into which the range of speed is subdivided, whilst the second one, smaller than the first one, corresponds to the number of constant frequency impulses that individualizes the lower limit of the zone of maximum speed (namely constitutes the "maximum value" previously considered with reference to FIG. 1) and the third one, smaller than the second one, corresponds to the number of constant frequency impulses that individualizes the upper limit of said zone of maximum speed (namely constitutes the "minimum value" previously considered with reference to FIG. 1). Said fixed values $N_2$ and $N_3$ are chosen taking into account the frequency of the generator 18 of impulses (FIG. 1), the angular distance between the notches 11 and 12 of the wheel 10 (FIG. 1) and the speed values that constitute respectively the lower limits and the upper limits of the various zones of the speed range; their difference obviously represents the number of the intervals comprised in the zone of maximum speed and more in general, as will be seen later on, in every single zone of the range of speed.

Into the register 52 there is instead charged initially, as a signal 19, the number $N_t$ of the impulses totalized in the counter 16 in the lapse of time corresponding to the passage of the two notches 11 and 12 of the wheel 10 before the sensor 14. Said number $N_t$ is successively replaceable by the numbers of impulses $N_c$ calculated by means of successive divisions of the number N available each time at the output of the register 52 by a factor K preset in a divisor 56 operated by the comparator 55, by means of an actuating signal 57, each time the comparator finds that, with one of the two fixed values $N_1$, $N_2$, charged into the register 51, the number N ($N_t$ or $N_c$) charged into the register 52 exceeds that fixed value; if such situation occurs, the comparator 55 operates also through a signal 58 the decrement of a counter 59 (here called "counter of zones") owing to the passage from a numeric value indicative of a zone of higher speed to another numeric value indicative of an adjacent zone of lower speed. In the case in which instead the comparator 55 finds in the register 52 a number N smaller than the fixed value $N_1$ or $N_2$ charged into the register 51, the same comparator operates through a signal 60 the commutation of the register 51 from $N_1$ to $N_2$ or, respectively, from $N_2$ to $N_3$.

If then in the register 51 there is charged the fixed value $N_3$, the comparator 55 is in a position to deliver the one or the other one of two signals 61 and 62 according to whether N be smaller or greater than $N_3$. In the former case the signal 61 gives directly information of this to an accumulating register 63, which receives also the information relative to the number of zone from the counter 59 in the shape of a signal 64 and delivers the numeric output signal 23, already mentioned with reference to FIG. 1. In the latter case the signal 62 enables operation of a subtractor 65 that subtracts the number N charged into the register 52 from a further fixed value $N_4$ equal to the fixed value $N_2$ diminished by one unit. The result of said subtraction is communicated to the accumulating register 63 in the shape of a signal 66.

Finally the microprocessor illustrated in FIG. 2 comprises an "initializator" or a setting-up and zeroizing unit 67, which at every cycle of speed detection, namely at every revolution of the wheel 10, receives from the output 23 a command 68 to set up through signals 69 and 70 the registers 51 and 52 in the conditions of charging of the numbers $N_1$ and, respectively, $N_t$ and through a signal 71 the zone counter 59 in the counting state corresponding to the zone of maximum speed The manner of operation of the various logical units illustrated in FIG. 2 is determined by the program pre-established for the microprocessor to which they belong. It provides various possibilities and, correspondingly, various interventions of the logical units according to the value of the number of impulses $N_t$ totalized by the counter with respect to the number of the fixed values $N_1$, $N_2$ and $N_3$.

If $N_t$ is smaller than $N_3$, namely than the minimum number corresponding to the upper limit of the zone of maximum speed of the range of speed considered, which means that the turning member under control turns at a speed higher than the maximum speed foreseen, the comparator 55 evidently finds that the number $N=N_t$ charged into the register 52 is smaller than the fixed value $N_1$ charged into the register 51, whence through a signal 60 it operates the commutation of the register 51 from $N_1$ to $N_2$. Having then detected that N is also smaller than $N_2$, through a further signal 60 the comparator 55 operates the commutation of the register 51 from $N_2$ to $N_3$. At that time the comparator detects that N is smaller also than $N_3$ and through a signal 61 it informs about it the accumulating register 63, which delivers as output a numeric signal, preferably in binary code, including the zone data (the data of the zone of maximum speed obtained from the zone counter 59 in the shape of a signal 64 and further pre-established data indicating that it is a question generically of an interval of speed higher than the upper limit of the zone of maximum speed.

If instead $N_t$ is greater than $N_3$ but smaller than $N_2$, namely is comprised between the already mentioned minimum value and maximum value, after the register 51 has been commanded in the manner already described to commute from $N_1$ to $N_2$ and then to $N_3$ the comparator 55 detects the condition $N>N_3$ and delivers a signal 62 of actuation of the subtractor 65. The latter then subtracts the number $N=N_t$ from the fixed value $N_4=N_2-1$ and transmits a signal 66 indicative of the value of the difference to the accumulating register 63, which utilizes that difference (representing the numeric distance of the lower zone limit) as a numeric datum indicative of the interval to be combined with the zone datum (still of maximum speed) received from the zone counter 59 as a signal 64.

If $N_t$ is greater also than $N_2$, namely is greater than the mentioned maximum value constituting the lower limit of the zone of maximum speed, but smaller than $N_1$, after the register 51 has been commanded in the manner already described to commute from $N_1$ to $N_2$ the comparator 55 detects the condition $N>N_2$ and delivers a signal 58 adapted to operate the decrement of the counter of zones 59 from the zone of maximum speed to the immediately lower zone and a signal 57 adapted cause, by the divisor, the demultiplication of the number $N=N_t$ by a pre-established factor K (e.g. 2). The number $N_c=N/K$ obtained through the demultiplication of the number of impulses actually totalized replaces the latter in the register 52, into which there thus appears to be charged a value $N=N_c$. This new value is moreover compared with the fixed value $N_2$ by the comparator 55, which, if $N>N_2$, commands a further decrement of the zone counter 59 and a further demultiplication N/K through the divisor 56 and then still further analogous operations until obtaining $N<N_2$ and, if this latter condition has already been attained, or at any rate when it will be attained, commands the commutation of the register 51 from $N_2$ to $N_3$ and then, through the subtractor 65, the communication of the datum of interval 66 to the accumulating register 63, where it is combined with the up-to-dated zone datum 64.

If $N_t$ is greater also than $N_1$, the comparator 55 detects that condition and commands through the signals 58 and 57 respectively the decrement of the zone counter 59 and the demultiplication N/K by the divisor 56, repeating then the operation until the condition $N<$ is verified. At that time, through a signal 60, the comparator 55 causes the commutation of the register 51 from $N_1$ to $N_2$ and, if the condition $N>N_2$ is found, the further effectuation of one or more operations of decrement of the zone counter 59 and of demultiplication N/K until finding a value N comprised between $N_2$ and $N_3$. The subtractor 65 then is commanded to carry out the subtraction $N_4-N$ to find out the datum of interval to be transmitted to the accumulating register 63, where it is combined with the up-to-dated datum of zone 64.

It may happen that the number $N_t$ provided by the counter 16 be so much higher than the fixed value $N_1$ as to require, for its reduction to below $N_2$, a number of demultiplications and, therefore, of decrements of the zone counter 59 beyond the overall number of zones minus 1. In such case it happens that once the counter of zones 59 has descended as far as the value corresponding to the zone of minimum speed, the subsequent command of decrement 58 induces the zone counter 59 to transmit to the accumulating register 63, in addition to the signal 64 containing the datum relative to the zone of lowest speed, a further signal 72 containing a pre-established datum of interval indicating that it is question generically of a speed lower than the minimum speed considered.

We claim:

1. An electronic device for providing a digital signal indicating the rotational speed of a rotating member which rotates at a variable speed within a preselected speed variation range, said speed variation range being subdivided into a preset number of zones and each zone being further subdivided into a preset number of intervals, sequential indicator numerals corresponding to said zones with said numerals being in a decreasing order of magnitude starting with a numeral indicating said zone of maximum speed, said device comprising transducer means operatively connected to said rotating member to generate for every revolution of said rotating member a first train of impulses spaced in time in a manner inversely proportional to the speed of rotation of said rotating member, impulse generating means for generating a second train of impulses at a constant frequency, counting means operatively connected to said transducer means and to said impulse generating means for receiving said trains of impulses, said counting means including means operable to effect the counting of the impulses of the second train of impulses and to be actuated to start and to stop said counting of impulses by two selected successive impulses of the first train of impulses, comparator means operatively connected to said counting means for comparing the number of impulses totalized by said counting means during the counting operation with reference values between a predetermined minimum value and a predetermined maximum value corresponding to the lower limit of said speed variation range and the maximum speed of said speed variation range and being operable to evaluate whether the number of impulses totalized is between said minimum value and said maximum value or whether said number of pulses is higher than said maximum value, processing means controlled by said comparator means for generating an output signal corresponding to said number of impulses totalized if said number is between said minimum value and said maximum value and to manipulate said number of impulses totalized if said number is greater than said maximum value until the number assumes a value between said minimum value and said maximum value to generate an output signal corresponding to the number of impulses calculated through said manipulation, said comparator means and said processor means being parts of a programmed microprocessor comprising a first register into which are successively loadable a first fixed value corresponding to the total number of intervals into which said speed variation range is subdivided, a second fixed value corresponding to said maximum value and a third fixed value corresponding to said minimum value and spaced from said second fixed value by a number corresponding to the number of intervals into which every zone of the range of speed is subdivided, a second register into which is loaded said number of impulses totalized by said counting means, a programmable counter for counting from one to another of said series of numerals indicative of the various zones of the speed variation range starting from that numeral corresponding to the zone of maximum speed, divisor means, subtractor means, and an output accumulating register to which said programmable counter delivers zone identifying numeral data as numeral data indicative of the counting state of said programmable counter, and said microprocessor being programmed to compare the number loaded into said second register with the fixed value loaded time by time into said first register and to divide said number loaded into said second register by selected coefficients of division to obtain a demultiplied number to be substituted for said loaded number in such a way that:

(a) if, with said first register loaded with said first fixed value, the number loaded into the second register is lower than said first fixed value, said microprocessor commands the commutation of said first register from said first fixed value to said second fixed value;

(b) if, with said first register loaded with said second fixed value, the number loaded into the second register is lower than said second fixed value, said microprocessor commands the commutation of said first register from said second fixed value to said third fixed value;

(c) if, with said first register loaded with said first fixed value or said second fixed value, the number loaded into said second register is higher than said first fixed value or respectively said second fixed value, said microprocessor commands the programming of said programmable counter and the actuation of said divisor means to obtain from said loaded number a demultiplied number and the loading of the demultiplied number, to be substituted for the number previously loaded, into said second register;

(d) if, with said first register loaded with said third fixed value, the number loaded into said second register is higher than said third fixed value, said microprocessor commands the subtractor means to subtract the loaded number from a fourth fixed value equal to said second fixed value minus one and to transmit the difference to said accumulating register as a datum of interval to be combined with the zone identifying datum delivered by said programmable counter; and (e) if, with said first register loaded with said third fixed value, the number loaded into said second register is lower than said third fixed value, said microprocessor directly transmits to said accumulating register a signal indicative of a datum of interval higher than the maximum speed considered.

2. A device according to claim 1, wherein said programmable counter is programmed in such a way that, if said microprocessor transmits to said programmable counter a command to reprogram while said programmable counter is in the state of counting corresponding to the zone of minimum speed, said programmable counter transmits to said accumulating register a signal indicative of a datum of interval lower than said minimum speed considered.

3. A device according to claim 2, wherein said microprocessor also includes an initializator for pre-setting said first register and said second register in conditions of loading including said first fixed value and respectively said totalized number and also for pre-setting said programmable counter in the state of counting corresponding to said zone of maximum speed.

4. A device according to claim 1, wherein said transducer means include a wheel rotatable at a speed proportional to the speed of said rotating member, said wheel being provided with at least two reference marks placed on its periphery at a predetermined angular spacing, and at least one sensor for delivering an impulse every time a reference mark of said wheel passes in front of said sensor.

* * * * *